(12) United States Patent
Negoro et al.

(10) Patent No.: US 9,123,247 B2
(45) Date of Patent: Sep. 1, 2015

(54) SURROUNDING AREA MONITORING APPARATUS FOR VEHICLE

(75) Inventors: Masaki Negoro, Saitama (JP); Yuji Yokochi, Saitama (JP); Naoto Akutsu, Saitama (JP); Morimichi Nishigaki, Saitama (JP); Kenichi Sawada, Saitama (JP); Fuminori Taniguchi, Saitama (JP); Nobuhiko Fujii, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 499 days.

(21) Appl. No.: 13/583,714

(22) PCT Filed: Feb. 21, 2011

(86) PCT No.: PCT/JP2011/000960
§ 371 (c)(1),
(2), (4) Date: Sep. 10, 2012

(87) PCT Pub. No.: WO2011/114624
PCT Pub. Date: Sep. 22, 2011

(65) Prior Publication Data
US 2013/0002874 A1    Jan. 3, 2013

(30) Foreign Application Priority Data
Mar. 17, 2010 (JP) .................................. 2010-060431

(51) Int. Cl.
*H04N 7/18* (2006.01)
*G08G 1/16* (2006.01)
(Continued)

(52) U.S. Cl.
CPC ................ *G08G 1/16* (2013.01); *G01S 17/023* (2013.01); *G01S 17/936* (2013.01); *H04N 5/232* (2013.01); *H04N 5/33* (2013.01); *H04N 7/183* (2013.01)

(58) Field of Classification Search
CPC ........... H04N 7/18; H04N 5/232; H04N 5/33; H04N 7/183; G08G 1/16; G01S 17/023; G01S 17/936
USPC .................................................. 348/148, 163
See application file for complete search history.

(56) References Cited

U.S. PATENT DOCUMENTS 8,478,480 B2 * 7/2013 Mian et al. .................... 701/31.4
2002/0116106 A1 * 8/2002 Breed et al. ...................... 701/45
(Continued)

FOREIGN PATENT DOCUMENTS

EP    1 160 550 A1    12/2001
EP    1 339 228 A1    8/2003
(Continued)

OTHER PUBLICATIONS

European Search Report dated Dec. 20, 2013 issued in corresponding European Patent Application.

*Primary Examiner* — Trang U Tran
(74) *Attorney, Agent, or Firm* — Carrier Blackman & Associates, P.C.; William D. Blackman; Joseph P. Carrier

(57) ABSTRACT

A surrounding area monitoring apparatus for vehicle includes an infrared camera mounted on a vehicle for capturing images of surrounding area around the vehicle, a unit for generating and displaying images based on image data captured by the camera, and a controller for calibrating output of the camera with respect to a relation between pixels, based on image data produced by imaging a surface of a shutter that opens and closes an aperture introducing a light to the camera, The controller estimates whether a temperature of the camera is stable, based on an operation state of the vehicle, and determines a possibility that a driver is looking at the unit, based on a behavior of the vehicle. When the temperature of the camera is estimated stable and the possibility that the driver is looking at the unit is determined to be low, the means for calibrating executes the calibration.

20 Claims, 6 Drawing Sheets

(51) Int. Cl.
*G01S 17/02* (2006.01)
*G01S 17/93* (2006.01)
*H04N 5/232* (2006.01)
*H04N 5/33* (2006.01)

(56) References Cited

U.S. PATENT DOCUMENTS

2002/0162963 A1* 11/2002 Lannestedt et al. ........... 250/351
2007/0168128 A1 7/2007 Tokoro et al.
2009/0201376 A1 8/2009 Bauer et al.
2011/0074916 A1* 3/2011 Demirdjian .................... 348/36

FOREIGN PATENT DOCUMENTS

| JP | 8-240831 A | 9/1996 |
| JP | 10-313428 A | 11/1998 |
| JP | 2001-153723 A | 6/2001 |
| JP | 2002-310804 A | 10/2002 |
| JP | 2007-336288 A | 12/2007 |
| JP | 4016022 B2 | 12/2007 |
| JP | 2008-187254 A | 8/2008 |

* cited by examiner

SURROUNDING AREA MONITORING APPARATUS FOR VEHICLE

FIELD OF THE INVENTION

The present invention relates to an apparatus for monitoring surrounding areas around a vehicle, more specifically to a control of a calibration timing for output of an infrared camera which monitors the surrounding areas.

RELATED ART

A temperature of the infrared camera mounted on the vehicle changes with, for example, an operation state of the vehicle. Consequently, output from the camera also changes, so that the output should be calibrated at a predefined timing.

However, if the calibration timing is controlled improperly, it results to hinder an operation for monitoring the surrounding area. That is, a monitoring image from the camera could not seen by a driver at his desired timing.

The patent document 1 discloses an infrared image-capturing device to be mounted on a movable entity. In this device, the timing of output calibration on the device is controlled according to, for example, whether or not the movable entity stops or moves slowly, or, whether or not target objects to be detected lies in the movement direction of the vehicle.

PRIOR ART DOCUMENT

Patent Document 1: Japanese Patent No. 4016022

SUMMARY OF THE INVENTION

Problem to be Solved

However, in the infrared image-capturing device described in the patent document 1, a condition for an execution timing of the output calibration on the device is not sufficient. The output calibration is not always executed at the time when the driver seems to have no intention to see the monitoring image, or at a suitable situation in terms of the state of the device. That is, the timing of the output calibration is not always properly controlled.

Therefore, the object of this invention is to make sure to keep a infrared camera stably operable to capture images of the target objects around the vehicle, by performing a correction (calibration) on the output of the camera at a specific condition (timing) determined as a time when the driver seems to have no intention to see a monitoring image, or a time when a state of the camera is estimated suitable for a calibration.

Solution to the problem

The present invention provides a surrounding area monitoring apparatus for vehicle. This apparatus comprises an infrared camera mounted on a vehicle, for capturing images of surrounding area around the vehicle. The apparatus includes a unit for generating and displaying images based on image data captured by the camera, and means for calibrating output of the camera with respect to a relation between pixels, based on image data produced by imaging a surface of a shutter that opens and closes an aperture introducing a light to the infrared camera. The apparatus also includes means for estimating whether or not a temperature of the camera is stable, based on a operation state of the vehicle, and means for determining a possibility that a driver is looking at the unit, based on a behavior of the vehicle. And, when the temperature of the camera is estimated stable and the possibility that the driver is looking at the unit is determined to be low, the means for calibrating executes the calibration.

According to this invention, the output calibration of the camera is executed when the temperature of the camera is estimated to be stable and the possibility that the driver is looking at the unit is determined to be low. Therefore, the calibration may properly be performed at a suitable state for the camera to be calibrated, without hindering an operation for monitoring the surrounding area.

According to one aspect of the present invention, further comprising a radar for determining location of a target object around the vehicle, the means for calibrating executes the calibration when the temperature of the infrared camera is estimated stable and the determined distance to the target object, a preceding vehicle, is equal to or less than a predetermined distance.

In this aspect of the present invention, the output calibration for the camera may be performed while the infrared camera is hindered from capturing images around the vehicle by a preceding vehicle moving nearby.

According to one aspect of the present invention, when the vehicle has travelled at a speed equal to or greater than a predetermined speed, for a time period equal to or longer than a predetermined period of time, the means for estimating estimates that the temperature of the camera is stable.

In this aspect of the present invention, the output calibration may be performed under a situation where the temperature of the camera is stable, i.e., under a suitable situation for the calibration.

According to one aspect of the present invention, during or just after a turn of the vehicle, or during quick acceleration or quick deceleration, the means for determining determines that the possibility is low that the driver is looking at the unit.

In this aspect of the present invention, the output calibration may be performed when the possibility is low that the driver is looking at the unit.

According to one aspect of the present invention, the means for estimating estimates whether or not the temperature of the camera is stable, according to a degree of a temperature change of the camera from the previous calibration to the present time.

In this aspect of the present invention, the calibration may be performed more quickly and properly according to the degree of the temperature change. For example, when the temperature change since the previous calibration is small, the calibration may be restrained. Conversely, when this temperature change is large, the calibration may be performed immediately.

According to one aspect of the present invention, when the vehicle and a predefined living object, detected on the basis of the image data captured by the camera, are in a predetermined positional relationship, the calibration is not executed.

In this aspect of the present invention, the execution of the calibration may be prevented while the camera image is required to be checked for safety driving, for example, while a human moves at a predetermined distance from the vehicle.

According to one aspect of the present invention, the means for calibrating determines a execution timing of the calibration on the basis of a navigation information from a navigation device.

In this aspect of the present invention, some responsive operation may be performed. For example, when the navigation information indicate a presence of a point of frequent traffic accidents, the execution timing of the calibration may be delayed until the vehicle goes past the point. Or, the execution timing of the calibration may be advanced so that the calibration will be completed before arriving at the point.

DESCRIPTION OF EMBODIMENTS

Figure 1:
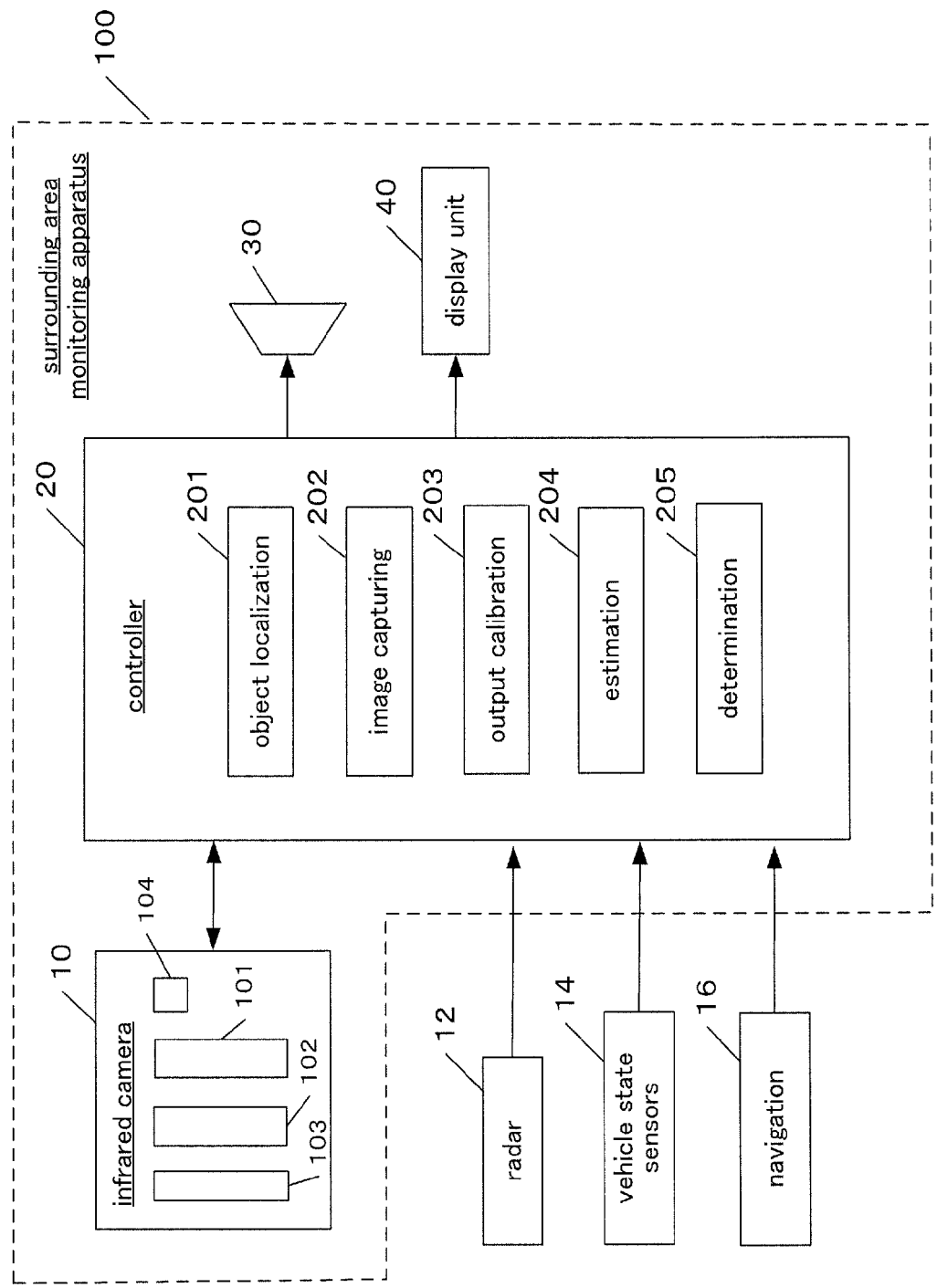
FIG. 1 is a block diagram showing a configuration of a surrounding area monitoring apparatus for vehicle according to one embodiment of the present invention.

A description will be made to embodiments of the present invention with reference to the accompanying drawings. FIG. 1 is a block diagram showing a configuration of a surrounding area monitoring apparatus for vehicle according to one embodiment of the present invention. The apparatus 100 is mounted on a vehicle, and includes a infrared camera 10 for capturing image of surrounding area around the vehicle, a controller 20, a speaker 30, and a display unit 40.

The camera 10 comprises an infrared detector 101 such as a microbolometer for detecting infrared light, an optical system 102 having a lens for imaging the light emitted from an object, on the detector 101, a shutter 103, and a temperature sensor 104. The detector 101 is a two-dimensional area sensor having two-dimensional array of pixels.

The shutter 103 is configured to be opened or closed at a timing determined by the controller 20. At a close state, the shutter 103 shuts out infrared light incident from objects into the optical system 102. Preferably, the shutter 103 has a shape whose surface temperature distributes uniformly, like a flat plate. The temperature sensor 104 detects a temperature inside of the camera 10 and sends a detection signal to the controller 20.

The controller 20, which is also called a electronic control unit (hereinafter referred to as "ECU"), is a computer having a central processing unit (CPU) and a memory. The controller 20 has roughly two main functions: (i) a function of image processing for detecting a target object around the vehicle based on image data captured by the camera 10, (ii) a function for performing several kinds of control, on the basis of signals received from the camera 10, a radar 12, vehicle state sensors 14, and a navigation device 16, which are mounted on the vehicle.

The radar 12 may be a scan-type laser radar, for example. The radar 12 emits a scanning beam in several directions. Then, the radar 12 receives the scanning beam reflected back from a object, and, thereby, determines a location of the object and a distance to it in each scanned directions. The word "vehicle state sensors 14" is described here as a general term for several types of sensors which detect a state of the vehicle by means of several kind of parameters. For example, the vehicle state sensors 14 includes a speed sensor for detecting a velocity of the vehicle, a acceleration sensor, a brake sensor, a yaw rate sensor for detecting yaw rate (i.e., a change rate of a rotation angle in a turning direction).

Each block in the controller 20 shown in FIG. 1 represents each function performed by the controller 20 (functional composition). That is, the controller 20 functions as: a object localization mean 201 for determining a location of (a distance to) a object around the vehicle, by receiving signals from the radar 12; a image capturing mean 202 for obtaining a gray-scale image around the vehicle, from the image captured by the infrared camera 10; a calibration mean 203 for calibrating the output of the infrared detector 101 in the infrared camera 10, with respect to a relation between pixels; an estimation mean 204 for estimating whether or not the temperature of the infrared camera 10 is stable; and a determination mean 205 for determining a possibility that the driver is looking at the display unit 40, based on a behavior of the vehicle.

A function of the each block is realized by the computer (CPU) in the controller 20. The controller 20 may be incorporated in the navigation device 16.

The controller 20 includes following exemplary components as its hardware configuration: an A/D converter for converting an analogue input signal into a digital signal; an video memory for storing digitized video signals; a central processing unit (CPU) for performing several kinds of arithmetic operation; RAM used by CPU for storing data during operation; ROM for storing programs executed by CPU and data (including tables and maps); and output circuitry for outputting signals such as a drive signal to the speaker 30 and a display signal to the display unit 40. The radar 12 and the infrared camera 10 are configured so that their output signals are provided to the CPU after the conversion to digital signals.

The speaker 30 issues an alarm by audible sounds or voice, according to a detection result about predefined target objects (e.g., pedestrian) in the controller 20. The display unit 40 displays images obtained via image capturing by the infrared camera 10, and also displays an indication of the target object around the vehicle for the driver. Alternatively, instead of the speaker 30 and the display unit 40, corresponding functions of the navigation device 16 may be used.

Figure 2:
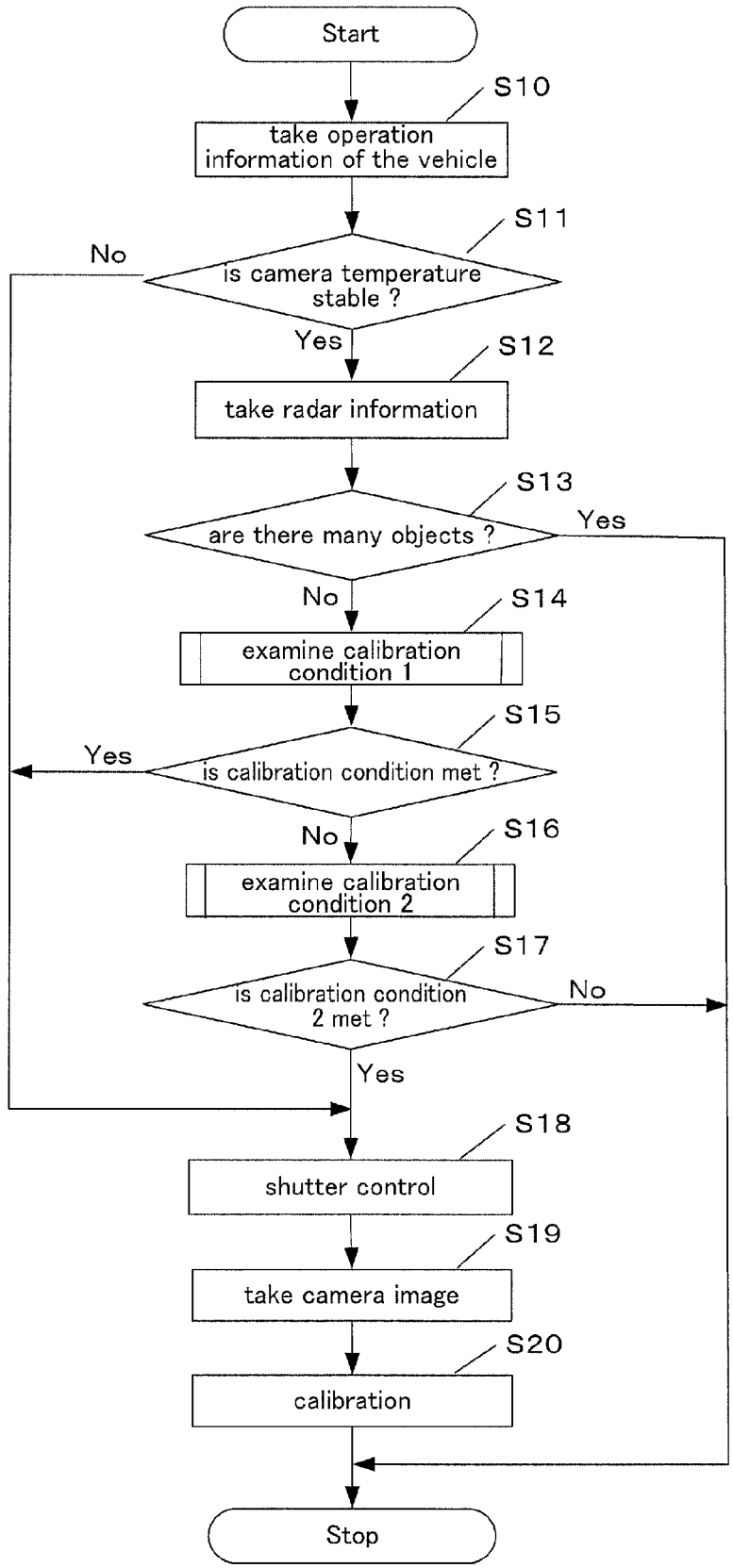
FIG. 2 is a chart showing a process flow executed by a controller according to one embodiment of the present invention.

FIG. 2 shows a process flow executed by the controller 20. This process flow is a control flow to calibrate output of the infrared detector 101 in the camera 10, with respect to a relation between pixels. The CPU in the controller 20 reads a program stored in a memory, and executes the program iteratively at a predetermined time interval.

In step S10, an operation information of the vehicle is obtained. This operation information includes, for example, a travelling time of the vehicle and a history of a speed change. In step S11, based on this operation information, it is determined whether or not the temperature of the camera is stable. If this determination is No, then, proceeding to step S18 for a shutter control, the calibration is executed. Because, when the temperature of the camera 10 is not yet stable, it is preferable to execute the calibration so that a appropriate camera image can be obtained.

Figure 5:
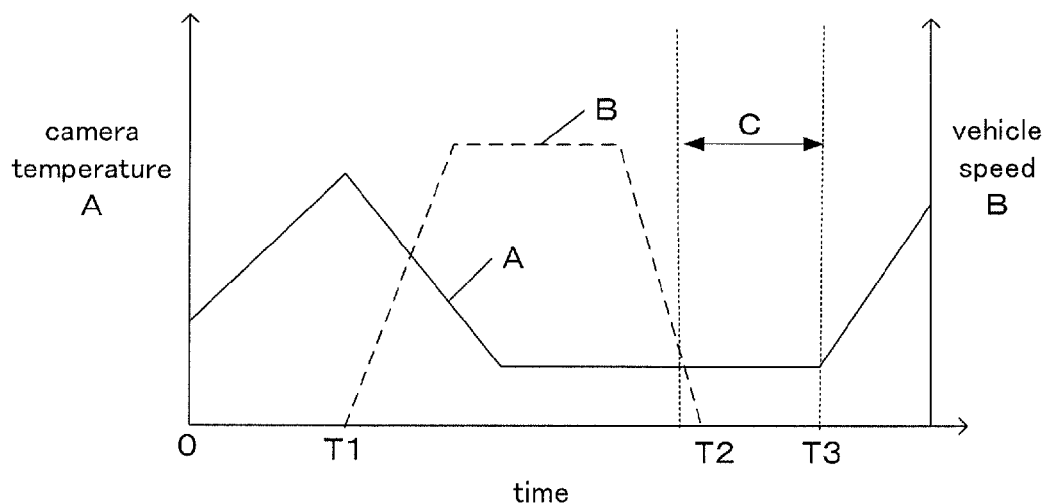
FIG. 5 is a graph to illustrate how to estimate whether or not the temperature of the infrared camera is stable.

FIG. 5 is a graph to illustrate an example of a method how to determine whether the temperature of the camera is stable or not. This graph shows a change of the temperature A of the infrared camera and a change of the vehicle speed B, in a situation where the vehicle starts an engine at time 0, starts to travel at time T1, stops at time T2, and restart idling at time T3. The temperature A of the camera increases during the idling after starting the engine of the vehicle, and, then, becomes stable due to the travelling at a constant speed. The temperature A is stable still after the stop of the vehicle, and increases again after the start of idling at time T3. From this relationship shown in FIG. 5 between the speed B and the temperature A of the camera, for example, within the time period C in FIG. 5, i.e., during deceleration after the constant speed travelling or just after the stop of the vehicle, the temperature of the camera is determined (estimated) to be stable.

In step 12, if the temperature of the infrared camera is determined to be stable, information about objects (location, distance) is obtained from the radar 12. In step S13, it is determined, based on the obtained information about the objects around the vehicle, whether or not the number of objects, such as other vehicles or humans, lying in front of the vehicle are many, that is, at least equal to or greater than a predetermined number. If this determination is Yes, the process is terminated. This termination is for avoiding a occurrence of a situation where the captured image of the surrounding objects is unavailable to be checked, due to the execution of the calibration.

If the determination in step S13 is No, then, in step 14, the calibration condition 1 is examined.

Figure 3:
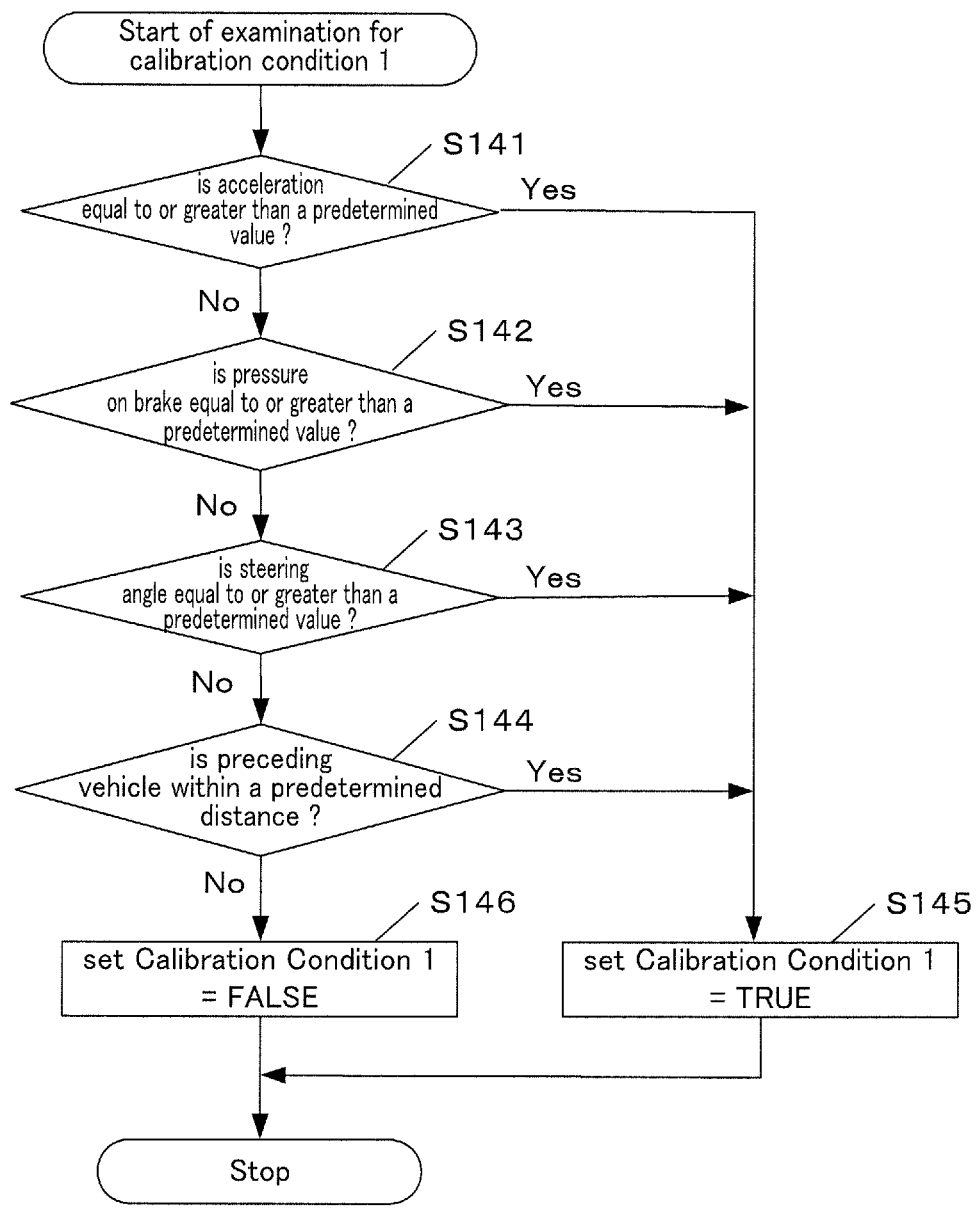
FIG. 3 is a chart showing an examination flow for calibration condition 1.

FIG. 3 is a chart of an examination flow for the calibration condition 1. In step S141, based on an acceleration data detected by a acceleration sensor, one of the vehicle state sensors 14, it is determined whether or not a degree of the acceleration is equal to or greater than a predetermined value. If this determination is Yes, then, in step S145, Calibration Condition 1=TRUE is set and a command to execute the calibration is issued. Because, in the case of a quick acceleration, a driver usually has no time to see the display unit, in other words, the possibility is low that the driver is looking at the display unit, so that there is no problem to execute the calibration.

If the determination in step S141 is No, then, in the next step S142, based on a data about a pressure on the brake, detected by a brake sensor, one of the vehicle state sensors 14, it is determined whether or not the pressure on the brake is equal to or greater than a predetermined value. If this determination is Yes, then, in step S145, Calibration Condition 1=TRUE is set and a command to execute the calibration is issued. Because, in the case of a quick deceleration, a driver usually has no time to see the display unit, in other words, the possibility is low that the driver is looking at the display unit, so that there is no problem to execute the calibration.

If the determination in step S142 is No, then, in the next step S142, based on data about a steering angle, detected by a yaw rate sensor, one of the vehicle state sensor 14, it is determined whether or not the steering angle is equal to or greater than a predetermined value. If this determination is Yes, then, in step S145, Calibration Condition 1=TRUE is set and a command to execute the calibration is issued. Because, in the case of a steep turn, a driver usually has no time to see a display unit, and, in other words, the possibility is low that the driver is looking at the display unit, so that there is no problem to execute the calibration.

If the determination in step S143 is No, then, in the next step S144, based on a data about a distance to a preceding vehicle detected by the radar 12, it is determined whether or not the distance to the preceding vehicle is equal to or less than a predetermined value. If this determination is Yes, Calibration Condition 1=TRUE is set and a command to execute the calibration is issued. Because, when the preceding vehicle is just ahead, it is hard to capture an image of surrounding area, so that there is no problem to execute the calibration. If the determination in step S144 is No, then, in step S146, Calibration Condition 1=FALSE is set and a command not to execute the calibration is issued.

Referring back to FIG. 2, it is determined, in step S15, whether or not the calibration condition 1 is met. If Calibration Condition 1=TRUE was set in the flow shown in FIG. 3, the calibration condition 1 is determined to be met in step S15, and, if Calibration Condition 1=FALSE was set, the calibration condition 1 is determined not to be met. If this determination in step 15 is Yes, the process proceeds to steps S18-S20 for calibration.

If the determination in step S15 is No, the calibration condition 2 is examined in the next step S16.

Figure 4:
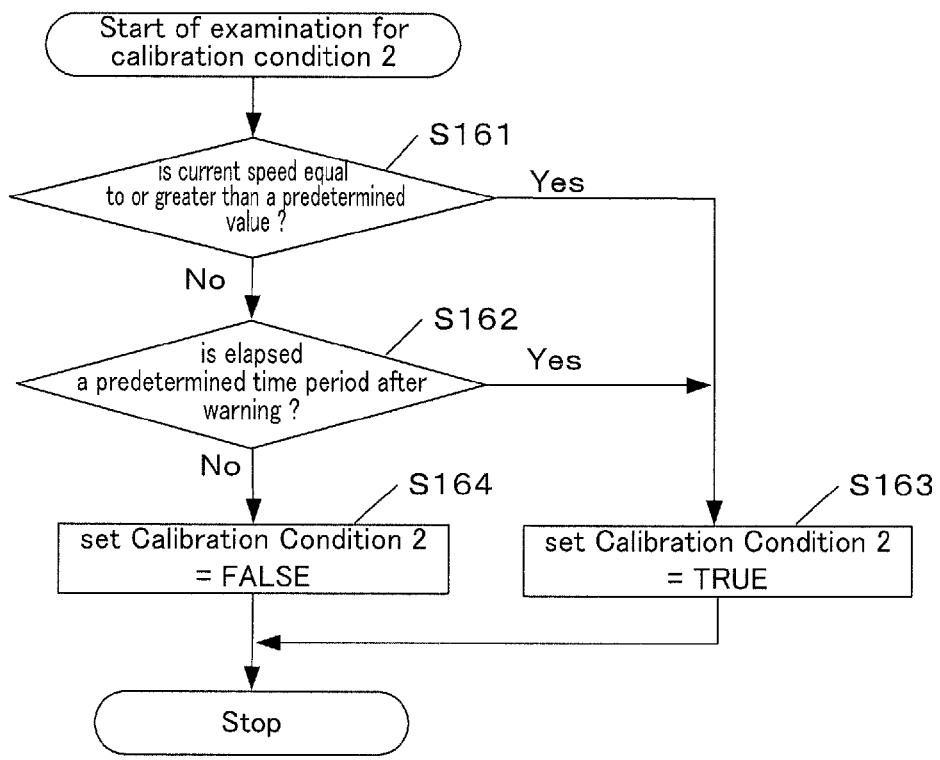
FIG. 4 is a chart showing an examination flow for calibration condition 2.

FIG. 4 is a chart showing an examination flow for the calibration condition 2. In step S161, based on a data about a speed detected by a speed sensor, one of the vehicle state sensors 14, it is determined whether or not the current speed is equal to or greater than a predetermined value. If this determination is Yes, then, in the next step S163, Calibration Condition 2=TRUE is set and a command to execute the calibration is issued. Because, while travelling at a high speed, a driver can not look away from the forward view, so that the possibility is low that the driver is looking at the display unit, and there is no problem to execute the calibration.

If the determination in step 161 is No, then, in the next step S162, it is determined whether or not the elapsed time since an issue of alarm through the speaker or the display unit is equal to or less than a predetermined time. If this determination is Yes, then, in step S163, Calibration Condition 2=TRUE is set and a command to execute the calibration is issued. Because, just after the issuing of the alarm, the driver' attention has just been prompted, so that there is no problem even though an image is unavailable on the display unit due to an execution of the calibration. If the determination in step S162 is No, then, in step S164, Calibration Condition 2=FALSE is set and a command not to execute the calibration is issued.

Referring back to FIG. 2, it is determined, in step S17, whether or not the calibration condition 2 is met. If Calibration Condition 2=TRUE was set in the flow shown in FIG. 4, the calibration condition 2 is determined to be met in step S17, and, if Calibration Condition 2=FALSE was set, the calibration condition 2 is determined not to be met. If this determination in step S17 is Yes, the process proceeds to steps 18-20 for calibration. If this determination is No, the process is terminated.

In step S18, in order to execute the calibration, the shutter 103 of the infrared camera 10 is controlled to be closed so that infrared light incident to the optical system 102 from objects will be shut. In step S19, an image of a surface of the shutter 103 is captured by the infrared camera 10. In step S20, the output of the infrared camera 10 capturing the surface image of the shutter 103 is calibrated. Specifically, in the case where surface temperature of the shutter 103 is distributed uniformly like a flat plate, the output is calibrated so that the uniform detection signals will be obtained over the two-dimensional pixel array of the infrared detector 101 in the camera 10, for example, by adjusting a signal amplification factor (gain) for each pixel or for each set of pixels (line or area of image). Any conventional method can be used for this adjustment (calibration).

Next, another embodiment, different from the process flow in FIG. 2, will be described, referring to FIGS. 6 and 7.

Figure 6:
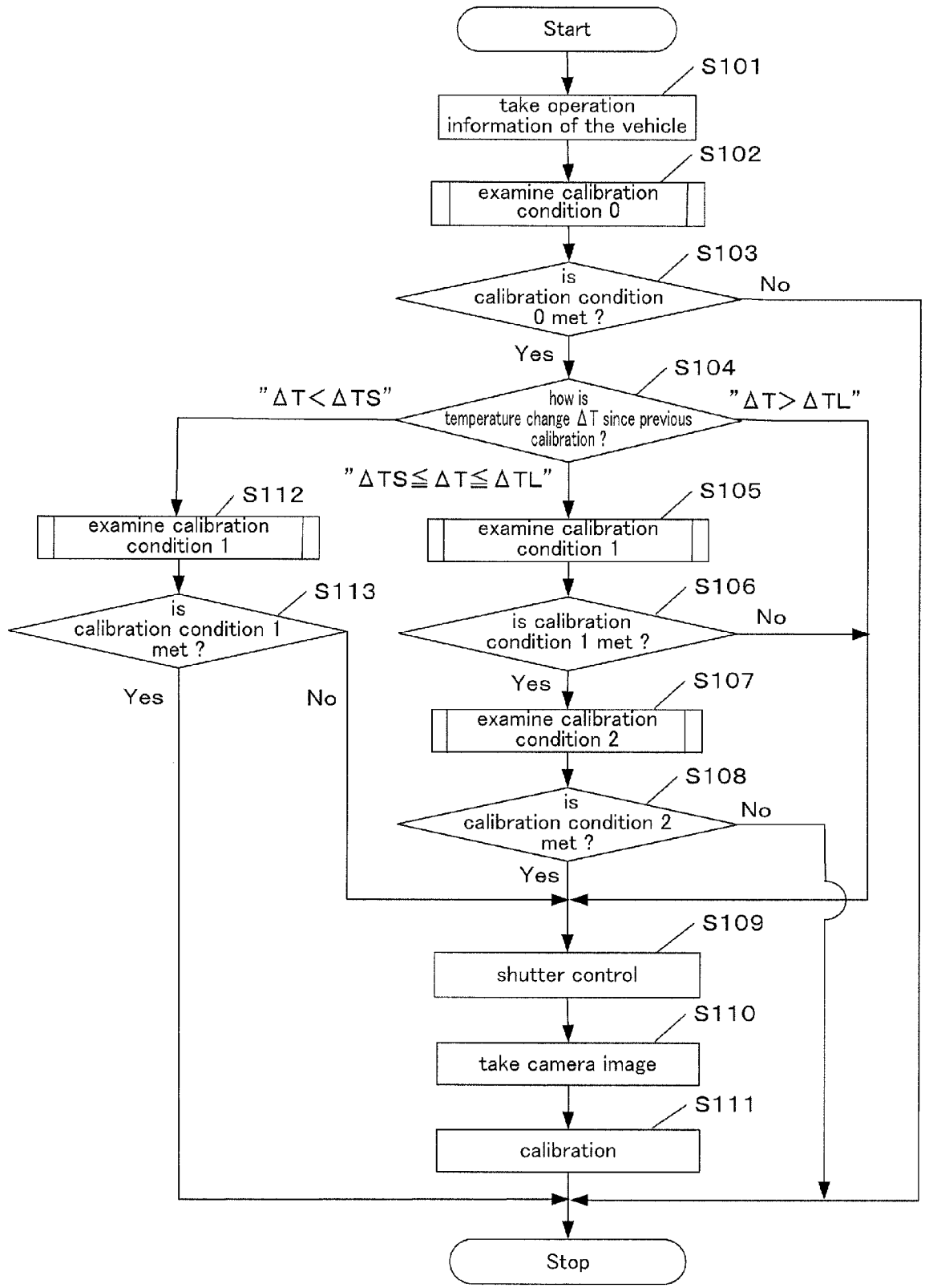
FIG. 6 is a chart showing a process flow executed by a controller according to one embodiment of the present invention.

FIG. 6 shows an another example of process flow executed by the controller 20. Main difference from the flow shown in FIG. 2 is that, in FIG. 6, three steps S102-S104 are substituted for the steps S11-S13 in FIG. 2. Processes in other steps S105-S111 of FIG. 6, that is, the processes for the examination of the calibration condition 1 and 2, the shutter control, and the calibration, are basically the same as those in the respective corresponding steps S14-S20 of FIG. 2.

In step S101 of FIG. 6, an operation information of the vehicle is obtained. This operation information includes, for example, a time of travel and a history of speed change. In step S102, the calibration condition 0 is examined.

Figure 7:
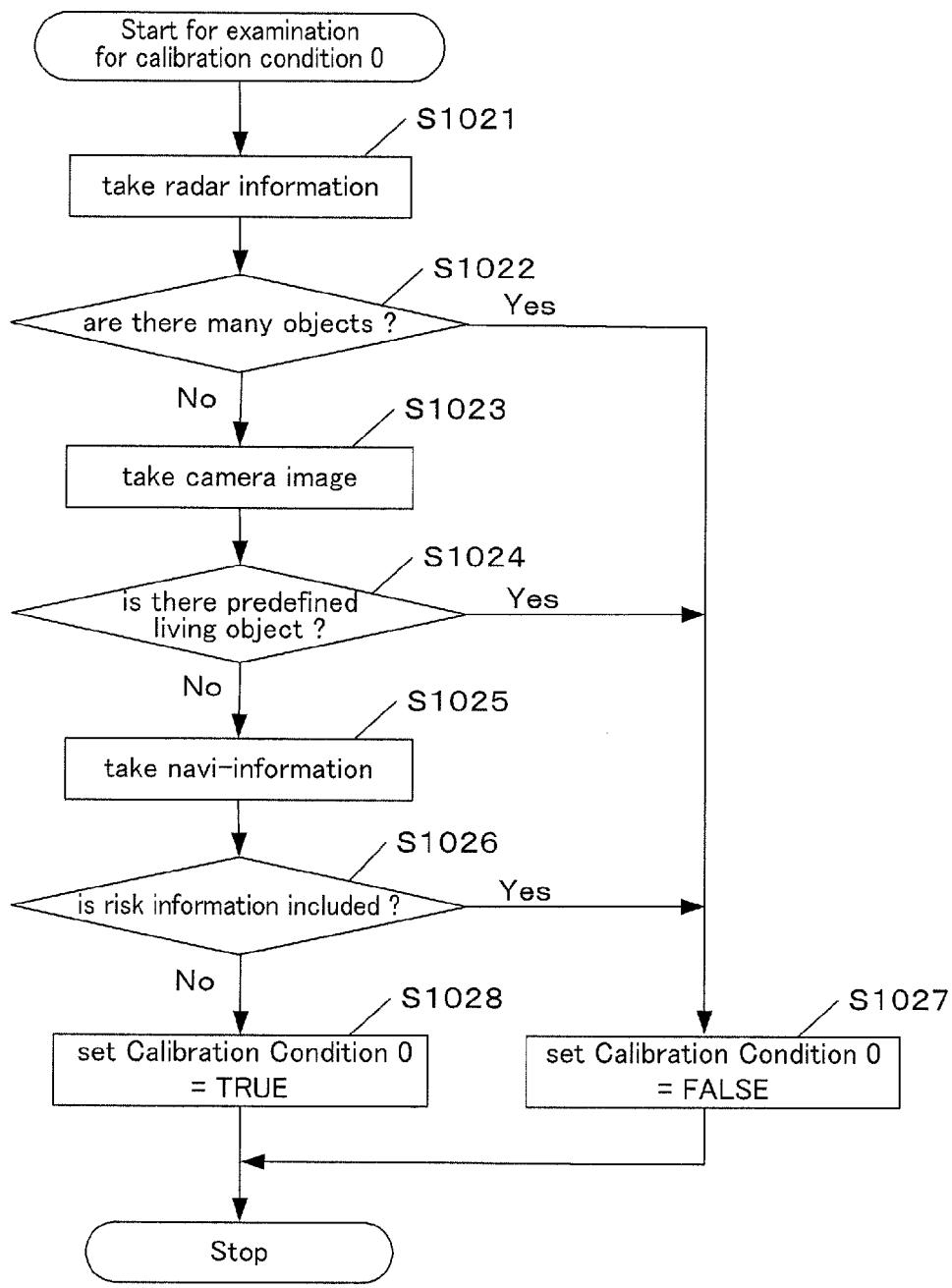
FIG. 7 is a chart showing an examination flow for calibration condition 0.

FIG. 7 is a chart showing an examination flow for the calibration condition 0. In step S1021, information about objects (location, distance) is obtained from the radar 12. In step S1022, based on the obtained information about the objects around the vehicle, it is determined whether or not the number of objects, such as other vehicles or humans, lying in front of the vehicle are many, that is, at least equal to or greater than a predetermined number. This determination process in step 1021 is the same as that in step S13 of FIG. 2. If this determination is Yes, then, in step S1027, Calibration Condition 0=FALSE is set and a command not to execute the calibration is issued. If this determination is No, the process proceeds to the next step S1023.

In step S1023, an image in front of the vehicle is captured by the infrared camera 10. In step S1024, based on the obtained image, it is determined whether or not there is a predefined living object (e.g., human, tetrapod). If this determination is Yes, then, in step S1024, Calibration Condition 0=FALSE is set and a command not to execute the calibration is issued. Because, in the case where there is the living object like a human, it is better to check the image in a safety point of view, so that the calibration should not be executed. If this determination is No, the process proceeds to the next step S1025.

In step S1025, information regarding preceding vehicles, traffic congestion, roads, etc. are obtained via the navigation device 16. In step S1026, it is determined whether or not the obtained information includes a risk information, e.g, a information regarding a presence of a dangerous road or a road of frequent traffic accidents, in a travel path. If this determination is Yes, then, in step S1026, Calibration Condition 0=FALSE is set and a command not to execute the calibration is issued. Because, when the risk information is included, the calibration should not be executed so that the image can be available to be checked in a safety point of view. If this determination is No, then, in step S1028, Calibration Condition 0=TRUE is set and a command to execute the calibration is issued.

Referring back to FIG. 6, it is determined, in step S103, whether or not the calibration condition 0 is met. If Calibration Condition 0=TRUE was set in the flow of FIG. 7, the calibration condition 0 is determined to be met in step S103 (i.e., the determination is Yes), and, if Calibration Condition 0=FALSE was set, the calibration condition 0 is determined not to be met (i.e., the determination is No). If this determination in step 103 is Yes, the process proceeds to step S104. If this determination is No, the process is terminated.

In the next step S104, the temperature change $\Delta T$ of the camera 10 from the previous calibration to the present time is calculated. And the magnitude relation between its absolute value and a predetermined value (a threshold value) is examined. This temperature change $\Delta T$ is calculated based on a detection signal of the temperature sensor 104.

If the temperature change $\Delta T$ is greater than the predetermined upper threshold value $\Delta TL$ ($\Delta T > \Delta TL$), then, proceeding to step S109, the calibration is executed immediately. Because, when the temperature change of the infrared camera 10 is especially large, it is better to execute the calibration soon. If the temperature change $\Delta T$ is less than the predetermined lower threshold value $\Delta TS$ ($\Delta T < \Delta TS$), then, proceeding to step S112, the calibration condition 1 is examined. The process flow for the examination of the calibration condition 1 is already described with reference to FIG. 3. If the temperature change $\Delta T$ is within a range between equal to or greater than the predetermined lower threshold value $\Delta TL$ and equal to or less than the upper threshold value ($\Delta TS \leq \Delta T \leq \Delta TL$), the process proceeds to step S105-S108 for the examination of the calibration condition 1 and the calibration condition 2. These examination processes in steps S105-S108 are the same as those in steps S14-S17 of FIG. 2 which are already described.

If the calibration condition 1 is not met in step S106 and S113 in FIG. 6 (i.e., the determination is No), or if the calibration condition 2 is met in step S108 (i.e., the determination is Yes), then, proceeding to steps S109-S111, the shutter 104 of the infrared camera 10 is controlled (to be closed), and the calibration is executed. This calibration processes are the same as those in step S18-S20 of FIG. 2. If the calibration condition 1 is met in step S113 (i.e., the determination is Yes), or if the calibration condition 2 is not met in step S108 (i.e., the determination is No), then, the process is terminated.

According to the flow, especially from step S102 to S104, shown in FIG. 6, the execution of the calibration may be restricted, for example, while the driver needs to check the image. Consequently, the frequency of the control to close the shutter may be minimized, while maintaining an accuracy of the calibration on the infrared camera.

As described above, according to the embodiments of the present invention, the calibration of the infrared camera (the shutter control) is performed in a state where the temperature of the infrared camera is stable, at a time when the execution of the calibration do not hinder a driving operation, especially, the driver's activity to check the surrounding areas. Therefore, the calibration may be performed precisely and efficiently at a proper timing.

Whereas a description is made here to the specific embodiments of the present invention, the present invention is not intended to limit to these embodiments. The present invention may be taken into practice by adding modifications to the foregoing embodiment without departing from the scope of the invention. For example, the present invention is applicable to a millimeter-wave radar.

REFERENCE SIGNS LIST

10: infrared camera
20: controller
30: speaker
40: display unit
100: surrounding area monitoring apparatus

The invention claimed is:

1. A surrounding area monitoring apparatus for a vehicle comprising:
   an infrared camera mounted on a vehicle, that captures images of surrounding area around the vehicle;
   a display unit that displays images based on image data captured by the infrared camera;
   a controller including a processor and a memory that are configured to:
   generate images to be displayed on the unit,
   calibrate output of the infrared camera with respect to a relation between pixels, based on image data produced by imaging a surface of a shutter that opens and closes an aperture introducing a light to the infrared camera;
   estimate whether or not temperature of the infrared camera is stable; and
   determine a possibility that a driver is looking at a image on the unit, based on a behavior of the vehicle,
   wherein, when the temperature of the infrared camera is estimated stable and the possibility that the driver is looking at the display unit is determined to be low, the controller executes the calibration.

2. The apparatus according to claim 1, further comprising a radar that determines location of a target object around the vehicle, wherein the controller executes the calibration when the temperature of the infrared camera is estimated stable and the determined distance to the target object, a preceding vehicle, is equal to or less than a predetermined distance.

3. The apparatus according to claim 1, wherein, when the vehicle has travelled at a constant speed equal to or greater than a predetermined speed, for a time period equal to or longer than a predetermined period of time, the controller estimates that the temperature of the infrared camera is stable.

4. The apparatus according to claim 1, wherein, during or just after a turn of the vehicle, or during quick acceleration or quick deceleration, the controller determines that the possibility is low that the driver is looking at a image on the unit.

5. The apparatus according to claim 1, wherein the controller estimates whether or not the temperature of the infrared camera is stable, according to a degree of a temperature change of the camera from the previous calibration to the present time.

6. The apparatus according to claim 1, wherein, when the vehicle and a predefined living object, detected on the basis of the image data captured by the infrared camera, are in a predetermined positional relationship, the controller executes the calibration.

7. The apparatus according to claim 1, wherein the controller determines an execution timing of the calibration, on the basis of a navigation information from a navigation device.

8. A surrounding area monitoring apparatus for a vehicle comprising:
   an infrared camera, mounted on a vehicle, for capturing images of surrounding area around the vehicle;
   means for generating and displaying images based on image data captured by the infrared camera;
   means for calibrating output of the infrared camera with respect to a relation between pixels, based on image data produced by imaging a surface of a shutter that opens and closes an aperture introducing a light to the infrared camera;
   means for estimating whether or not temperature of the infrared camera is stable; and
   means for determining a possibility that a driver is looking at a image on the means for displaying, based on a behavior of the vehicle,
   wherein, when the temperature of the infrared camera is estimated stable and the possibility that the driver is looking at the means for displaying is determined to be low, the means for calibrating executes the calibration.

9. The apparatus according to claim 8, further comprising a radar for determining location of a target object around the vehicle, wherein the means for calibrating executes the calibration when the temperature of the infrared camera is estimated stable and the determined distance to the target object, a preceding vehicle, is equal to or less than a predetermined distance.

10. The apparatus according to claim 8, wherein, when the vehicle has travelled at a constant speed equal to or greater than a predetermined speed, for a time period equal to or longer than a predetermined period of time, the means for estimating estimates that the temperature of the infrared camera is stable.

11. The apparatus according to claims 8, wherein, during or just after a turn of the vehicle, or during quick acceleration or quick deceleration, the means for determining determines that the possibility is low that the driver is looking at a image on the means for displaying.

12. The apparatus according to claim 8, wherein the means for estimating estimates whether or not the temperature of the infrared camera is stable, according to a degree of a temperature change of the camera from the previous calibration to the present time.

13. The apparatus according to claim 8, wherein, when the vehicle and a predefined living object, detected on the basis of the image data captured by the infrared camera, are in a predetermined positional relationship, the calibration is not executed.

14. The apparatus according to claim 8, wherein the means for calibrating determines a execution timing of the calibration, on the basis of a navigation information from a navigation device.

15. A method for monitoring surroundings of a vehicle with an infrared camera and a display device, comprising:
   capturing images of surrounding area around the vehicle by the infrared camera;
   generating and providing images for the display device, based on image data captured by the infrared camera;
   calibrating output of the infrared camera with respect to a relation between pixels, based on image data produced by imaging a surface of a shutter that opens and closes an aperture introducing a light to the infrared camera;
   estimating whether or not temperature of the infrared camera is stable; and
   determining a possibility that a driver is looking at a image on the display device, based on a behavior of the vehicle,
   wherein, when the temperature of the infrared camera is estimated stable and the possibility that the driver is looking at the display device is determined to be low, the calibration is executed.

16. The method according to claim 15, further comprising: determining location of a target object around the vehicle by a radar, wherein the calibration is executed when the temperature of the infrared camera is estimated stable and the determined distance to the target object, a preceding vehicle, is equal to or less than a predetermined distance.

17. The method according to claim 15, wherein, when the vehicle has travelled at a constant speed equal to or greater than a predetermined speed, for a time period equal to or longer than a predetermined period of time, the temperature of the infrared camera is estimated stable.

18. The method according to claims 15, wherein, during or just after a turn of the vehicle, or during quick acceleration or quick deceleration, the possibility that the driver is looking at a image on the display device is determined to be low.

19. The method according to claim 15, wherein it is estimated whether or not the temperature of the infrared camera is stable, according to a degree of a temperature change of the camera from the previous calibration to the present time.

20. The method according to claim 15, wherein, when the vehicle and a predefined living object, detected on the basis of the image data captured by the infrared camera, are in a predetermined positional relationship, the calibration is not executed.

* * * * *